Patented June 14, 1932

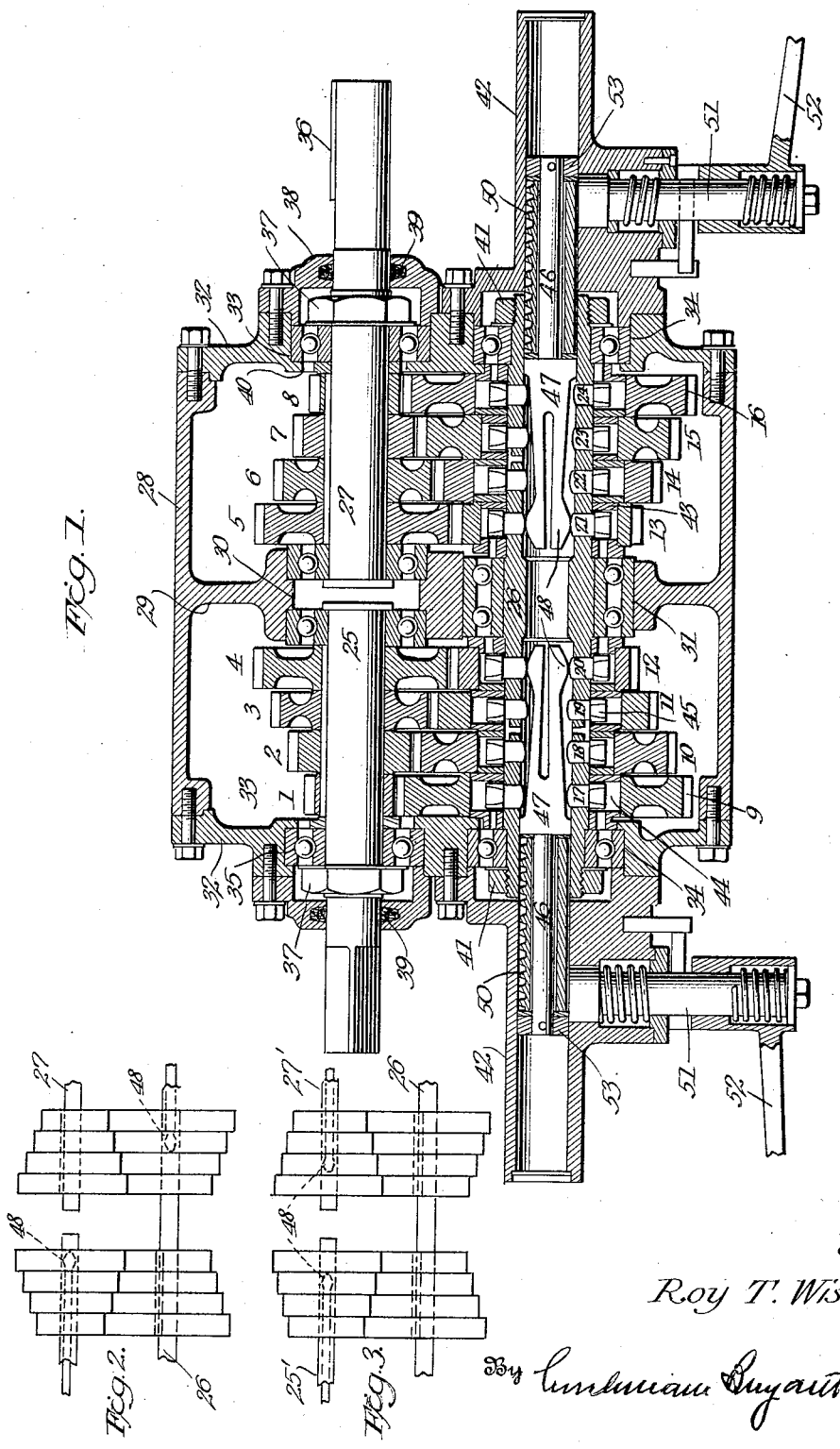

1,862,993

UNITED STATES PATENT OFFICE

ROY T. WISE, OF BERKELEY, CALIFORNIA, ASSIGNOR TO WISE PATENT AND DEVELOPMENT COMPANY, OF NEW YORK, N. Y., A CORPORATION OF DELAWARE

CHANGE SPEED GEAR

Application filed September 29, 1930. Serial No. 485,211.

This invention relates to new and useful improvements in change speed gearing.

An important object of the invention is to provide a change speed gearing which increases the range and number of speeds with a compact mechanism, wherein all the gears are in constant mesh to obviate clashing, and the arrangement thereof is such as to effect varying degrees of high, low and intermediate speeds.

Another object of the invention is to provide certain of the loose gears with clutch mechanisms possessing means for automatically compensating for wear between the clutch parts to obviate the necessity of tearing down the mechanism to make adjustments, repairs and replacements.

Other objects and advantages of the invention will become apparent during the course of the following description.

In the accompanying drawing forming a part of the description,

Figure 1 is a longitudinal section through the change speed gearing,

Figure 2 is a diagrammatic view of a modification thereof, and

Figure 3 is a diagrammatic view of another modification thereof.

Referring now more particularly to the drawing, the invention has been illustrated in conjunction with a novel type of clutch, such as disclosed in my United States Patent No. 1,770,290, granted July 8, 1930, further modifications of which are disclosed in my co-pending application Serial No. 485,212, filed September 29, 1930.

This change speed mechanism is preferably housed by a casing 28 of any desirable configuration and capable of stationary support in any way to adapt the change speed mechanism to varying usuage. This casing is equipped with a central bearing web 29 having upper and lower bearing apertures 30 and 31, respectively. The opposite open ends of this casing are closed and rendered leakproof by closure plates 32 provided with upper and lower bearings 33 and 34, respectively, in alignment with the bearings 30 and 31 as shown. Ball bearings 35 are mounted in all of the bearing openings of the intermediate web 29 and the closure plates 32 to reduce friction of the shafts mounted therein. A drive or motor shaft 25 is mounted in the bearings 30 and 33 so that one end thereof projects into the casing 28 and terminates at that end at the intermediate portion of the bearing 30. A driven shaft 27, by which power is transmitted out of the change speed gearing is mounted in the antifriction bearings contained in bearings 30 and 33 with one end arranged within the casing 28 coaxial with the motor shaft 25. The inner end of the driven shaft terminates within the bearing 30 while its outer end projects beyond the casing and is provided with a key 36 or other suitable means for securing a driven element in the form of a pulley, gear, or otherwise, to this projecting end of the shaft. Thrust nuts 37 are secured to the drive and driven shafts, and are enclosed by caps 38 bolted to the closure plates 32 as shown, and containing a packing gland 39 about their respective shafts to seal the casing against lubricant leakage, it being understood that lubricant fills the casing 28, whereby the gears to be presently described, run in lubricant. In this connection it will be observed that lubricant openings 40 are provided in the closure plates 32 to permit the passage of lubricant into the antifriction bearings 35.

The change speed gearing includes a series of gears 1, 2, 3 and 4 keyed to the motor shaft 25, which gears are of progressively increasing diameter from left to right. The gearing also includes a second series of inversely arranged gears 5, 6, 7 and 8, keyed to the driven shaft 27. The gears of each series are arranged side by side as shown, and between their respective antifriction bearings 35 and closure plates 32, whereby longitudinal displacement of these gears along its respective shaft is precluded.

In order to provide a mounting for two additional series of gears for mesh with the two series mounted upon the drive and driven shafts, a tubular countershaft 26 is mounted within the casing 28 parallel to the aforesaid shafts, with its medial portion mounted in the antifriction bearing 35 contained in bearing opening 31 and its two ends mounted in the antifriction bearings contained in the bearing openings 34 provided in the two closure plates 32. Thrust nuts 41 are screwed onto the two ends of the tubular countershaft to prevent longitudinal displacement thereof. These thrust nuts and bearings in the openings 34 are housed by casings 42 of clutch shifting mechanisms to be presently described, and which is specifically disclosed in my copending application Serial No. 380,634, filed July 24, 1929.

Loosely mounted upon the tubular countershaft 26 is a third series of gears 9, 10, 11 and 12, of progressively decreasing diameters from left to right for mesh respectively with the gears 1, 2, 3 and 4 keyed to the motor shaft 25. Mounted on this countershaft on the opposite side of the central bearing 31 is a fourth series of gears 13, 14, 15 and 16, inversely arranged with respect to the gears 9 to 12 inclusive, for constant mesh with the gears 5, 6, 7 and 8, respectively, keyed to the driven shaft 27. Each of the loose gears 9 to 16 inclusive, is loosely mounted upon bearing discs 43. Each of these gears has associated therewith a friction clutch designated by the numerals 17 to 24 inclusive, for progressively coupling any of the gears 9 to 16 inclusive, to the tubular countershaft 26.

As explained in my aforesaid copending application, each of these clutches comprises generally a pair of inherently resilient segmental clutch shoes 44 mounted in the enlarged bore of its respective gear and having a running clearance therewith, whereby the gear is normally free of connection with the countershaft. The adjacent ends of the clutch shoes of each clutch are spaced apart and bevelled to an angle of approximately twenty degrees (20°) to form tapered seats or sockets, in which are adapted to operate radially, radially movable clutch elements 45, slidably mounted in diametrically disposed drilled openings in the tubular countershaft 26, so that their inner ends normally project into the bore of the countershaft. These clutch elements 45 are provided with enlarged tapered heads, which are normally disposed between the bevelled ends of the clutch shoes, so that upon outward radial movement of these clutch elements, the pair of segmental clutch shoes are caused to expand circumferentially and radially to establish a frictional grip upon the bore of its respective gear to couple the same to the countershaft. Upon inward radial movement of the clutch elements 45 caused by the release and contraction of the clutch shoes, the loose gear carrying this clutch is disconnected from driving engagement with the countershaft.

In order to establish a driving connection between the countershaft and one loose gear of either series, a clutch operating mechanism is associated with each series of loose gears to obtain the varying degrees of high, low and intermediate speeds, as well as an increased range of speeds. Each clutch operating mechanism includes a clutch operating rod 46 mounted for longitudinal sliding movement in opposite directions within the tubular countershaft 26. One end of each clutch operating rod 46 is enlarged, as at 47, to have a snug fit within the countershaft and toward its free end is gradually reduced in diameter and then enlarged at its free end to provide a knob or cam 48. This cam is adapted for selective engagement with any pair of clutch elements 45 of one series of loose gears for moving them radially outward for expansion of the selected clutch. This outer end of the clutch actuating rod is equipped with a diametrical longitudinally extending slot 49 to render the cam portions of the rod inherently resilient, and to cause them to be normally separated as shown, when in clutch engaging position. This arrangement yieldingly retains the clutch in clutch-engaging position, and not only provides for the requisite flexibility in the clutch, but automatically compensates for any wear occurring between the clutch parts.

This clutch operating rod 46 rotates with the tubular countershaft, whereby its cam portions 48 are always disposed in proper positions to operate the clutch elements 45 when moved longitudinally, and the reduced stem 46 of this rod is rotatably mounted within a tubular sliding rack 50, the teeth of which are adapted for mesh with a pinion, not shown, keyed to a stub shaft 51 mounted in the clutch operating casing 42, and provided with an operating handle 52, as explained in my aforesaid copending applications. This rack sleeve 50 is mounted in a bronze bearing having a loose fit within the bore of the casing 42 to prevent galling of the rack sleeve during operation. The outer end of each clutch actuating rod 46 is, of course, provided with an abutment 53 for engagement with one end of the rack sleeve 50, while the opposite end is adapted to abut the enlarged portion 47 when moving in one direction on the other.

In operation, it will be seen that the drive through the change speed gearing is from the power shaft 25 into the countershaft 26, and then into the driven shaft 27. For low speed, the loose gear 9 is coupled to the countershaft 26 by moving the clutch operating rod to the left of the figure to cause the cam portions 48 to radially move the clutch elements 45 of the gear 9 outwardly to expand the segmental clutch shoes therein, thereby causing rotation of the countershaft at a reduced speed relative to the power shaft. The speed of the countershaft may be taken off through the driven shaft 27 in varying degrees of speed, depending upon which of the gears 13 to 16 are clutched to the countershaft. When the gear 13 is clutched to the countershaft, it causes rotation of the gear 5 on the driven shaft at a reduced speed. This speed may be gradually increased successively by clutching either of gears 14 or 15 to the countershaft to cause the drive to be taken out through gears 6 or 7. When the gear 16 is clutched to the countershaft, it being shown as the same size as gear 9, the drive taken out through gear 8 and driven shaft 27 will be the same as the speed of gear 1.

First speed is obtained by clutching gear 10 to the countershaft and varying degrees of this speed obtained by selectively coupling gears 13, 14, 15 and 16 to the countershaft. Second speed and varying degrees thereof is obtained by clutching gear 11 to the countershaft and any one of the gears 13 to 16 inclusive. High speed is, of course, obtained by clutching gear 12 to the countershaft and varying speeds of this obtained by actuation of any of the clutches associated with gears 13 to 16 inclusive.

Of course, it will be appreciated that additional speeds may be obtained from this arrangement of gearing by varying the number of gears, or the sizes of the various gears constituting the several trains.

The foregoing results can also be obtained in many different ways, several of which are illustrated in the diagrammatic views on the drawing, wherein parts corresponding to those shown in Figure 1 are designated by the same reference numerals. Referring to Figure 2, it will be noted that the drive shaft 25' is tubular like the countershaft 26, but instead of employing two clutch shifting mechanisms on the countershaft, only one designated at 48 and associated with a series of gears 13 to 16 inclusive, is employed, the other clutch mechanism 48 being associated with the tubular drive shaft 25' carrying a series of gears 1 to 4 inclusive. In this modification the series of gears 9 to 12 inclusive are keyed to the tubular countershaft and the series 5 to 8 inclusive is keyed to the same type of driven shaft 27 illustrated in Figure 1.

In Figure 3, it will be noted that both the drive shaft 25' and the driven shaft 27' are tubular and each has operating therein, the clutch mechanism 48 as shown for progressively clutching any of the loose gears 1 to 8 inclusive to the respective shafts. In such an instance, the gears 9 to 16 inclusive are all keyed to a solid countershaft 26'. As a further modification, the drive shaft 25 may be the same as disclosed in Figure 1 with the series of gears 1 to 4 keyed thereto and the driven shaft 27' may assume tubular form with a clutch mechanism associated therewith, and the series of gears 5 to 8 loosely mounted thereon. In such modification, the countershaft would include a tubular portion for loosely mounting the series of gears 9 to 12 and a solid portion on which the series of gears 13 to 16 would be keyed. Of course, the tubular portion of the countershaft in this instance would have a clutch mechanism associated therewith as in the previous forms for selectively coupling any one of the gears of the series 9 to 12 to the countershaft.

I claim:

A multiple speed constant mesh gear transmission comprising a casing having a central bearing web, a drive shaft, a driven shaft in horizontal alignment with said drive shaft, said shafts having their inner ends journaled in said central web and their outer ends journaled in the walls of the casing, a countershaft extending longitudinally of the casing and vertically spaced relative to the drive and driven shaft, the medial portion of said countershaft being journaled in said central web, and the ends thereof journaled in the side walls of the casing, a series of gears keyed to the drive shaft, a series of gears keyed to the driven shaft, a series of gears loosely mounted on the countershaft on each side of the central web and constantly meshing with the complementary gears on the drive and driven shaft, a clutch for each loose gear, clutch actuating rods axially movable in the countershaft for progressively clutching the loose gears thereto, each of said rods having a cam portion slotted to render the same inherently resilient, whereby means are provided to change from one speed to the other at full speed.

In testimony whereof I have hereunto set my hand.

ROY T. WISE.